United States Patent [19]

Palata

[11] Patent Number: 5,390,100
[45] Date of Patent: Feb. 14, 1995

[54] FREELY OSCILLATING SWITCHED-MODE POWER SUPPLY

[75] Inventor: Jaromir Palata, Villingen, Germany

[73] Assignee: Deutsche Thomson-Brandt GmbH, Villingen-Schwenningen, Germany

[21] Appl. No.: 43,714

[22] Filed: Apr. 8, 1993

[30] Foreign Application Priority Data

Apr. 14, 1992 [DE] Germany ............................ 4212472

[51] Int. Cl.$^6$ ........................................ H02M 3/335
[52] U.S. Cl. ........................................ 363/19; 363/18
[58] Field of Search ............ 363/16, 17, 18, 19, 363/98, 132; 323/282, 284, 289

[56] References Cited

U.S. PATENT DOCUMENTS

| | | | |
|---|---|---|---|
| 4,361,865 | 11/1982 | Shono | 363/19 |
| 4,573,112 | 2/1986 | Numata et al. | 363/19 |
| 4,958,268 | 9/1990 | Nagagata et al. | 363/16 |
| 5,175,675 | 12/1992 | Uramoto | 363/19 |

FOREIGN PATENT DOCUMENTS

| | | | |
|---|---|---|---|
| 0096300 | 5/1983 | European Pat. Off. | H02M 3/335 |
| 0466627 | 5/1991 | European Pat. Off. | H04N 5/63 |
| 2651196 | 5/1978 | Germany | H02P 13/22 |
| 274308 | 12/1989 | Germany | H02M 7/217 |
| 3943254 | 7/1991 | Germany | H04N 3/18 |

OTHER PUBLICATIONS

Patent Abstracts of Japan vol. 4 No. 97 Jul. 12, 1980.

*Primary Examiner*—Steven L. Stephan
*Assistant Examiner*—Matthew Nguyen
*Attorney, Agent, or Firm*—Joseph S. Tripoli; Joseph J. Laks; Francis A. Davenport

[57] ABSTRACT

A freely oscillating switched-mode power supply includes a transformer having a power winding for providing an output voltage, a drive winding for providing a switching voltage and a regulating winding for providing a measuring voltage. A switching transistor provides a cutoff voltage to change the output voltage. A rectifier receives the measuring voltage and generates a control voltage representative of the measuring voltage. A first voltage divider receives the control voltage and turns the switching transistor on when the cutoff voltage is above a first threshold value. A second voltage divider receives the control voltage and turns the switching transistor off when the cutoff voltage is below a second threshold value.

7 Claims, 3 Drawing Sheets

FREELY OSCILLATING SWITCHED-MODE POWER SUPPLY

BACKGROUND OF THE INVENTION

This invention is directed to a freely oscillating switched-mode power supply. Switched-mode power supplies having control only on the primary side of the isolating transformer have the advantage that there is no need for a transmission element for transmitting a controlled variable from the secondary side of the primary side of the transformer. However, there is the disadvantage that the voltages to be stabilized on the secondary side are not directly evaluated and thus the control for stabilizing these voltages is frequently not sufficient. Switched-mode power supplies having control on the secondary side to the primary side have the advantage that effective stabilization is achieved by the direct evaluation of the secondary-side voltages to be stabilized. However, there is the disadvantage that an element, such as an isolating transformer or an optocoupler, is required to transmit a controlled variable from the secondary side to the primary side.

When such switched-mode power supplies in a television receiver are switched over for active standby operation to a low transmitted power of approximately 5–8 watts, the switching transistor would need to be switched on only for very short times. This can result in relatively high switching losses and risk to the switching transistor. It is therefore known in the case of operation with low transmitted power to switch on the switching transistor only in a packet-like or burst-like fashion with a sufficiently long turn-on time and sufficiently high current and to cause it to be blocked therebetween for a relatively long time during which absolutely no power is transmitted. Switched-mode power supplies which operate according to this principle are relatively complicated in design and generally require special integrated circuits.

SUMMARY OF THE INVENTION

The object of the invention is to provide a freely oscillating switched-mode power supply, which has discrete subassemblies and requires no special ICs, renders possible automatic operation using PWM control for stabilization in the case of full transmitted power and packet control in the case of low transmitted power, is short-circuit-proof, provides effective stabilization despite the pure primary control, and has a good efficiency.

The switched-mode power supply according to the invention essentially has several advantages. Because control is only on the primary side, there is no requirement for an element to transmit a controlled variable from the secondary side to the primary side. However, effective stabilization of the operating voltages generated on the secondary side is achieved by PWM control in the case of normal operation at high power by controlled division of the cut-off voltage tapped from a shunt. Because there are two circuits with different threshold values, there is an automatic transition from PWM control in normal operation to packet control in operation at low transmitted power. In this case, use is preferably made of subassemblies, already present, for switching on and realizing these different modes of operation. The primary side forms an oscillator by means of which the switched-mode power supply is constructed in a freely oscillating fashion. Moreover, this oscillator has two functions. In the case of high transmitted power in normal operation, it effects continuous PWM control in driving the switching transistor, but on the other hand, in the case of low transmitted power, it automatically effects a pause in driving the switching transistor in order to achieve the described packet operation.

In accordance with the invention, a negative internal resistance of the switched-mode power supply is simulated, which compensates the positive internal resistance inherently present, and thereby renders possible a switched-mode power supply having a very low internal resistance. In another facet of the invention, an additional circuit measure substantially improves the turn-off performance of the switching transistor at the start of the blocking phase. The invention can be advantageously applied, in particular, for relatively small television receivers, and likewise in the case of comparable units such as video recorders and CD players.

BRIEF DESCRIPTION OF THE DRAWING

The invention is described with reference to the drawing, in which.

DETAILED DESCRIPTION

Figure 1:
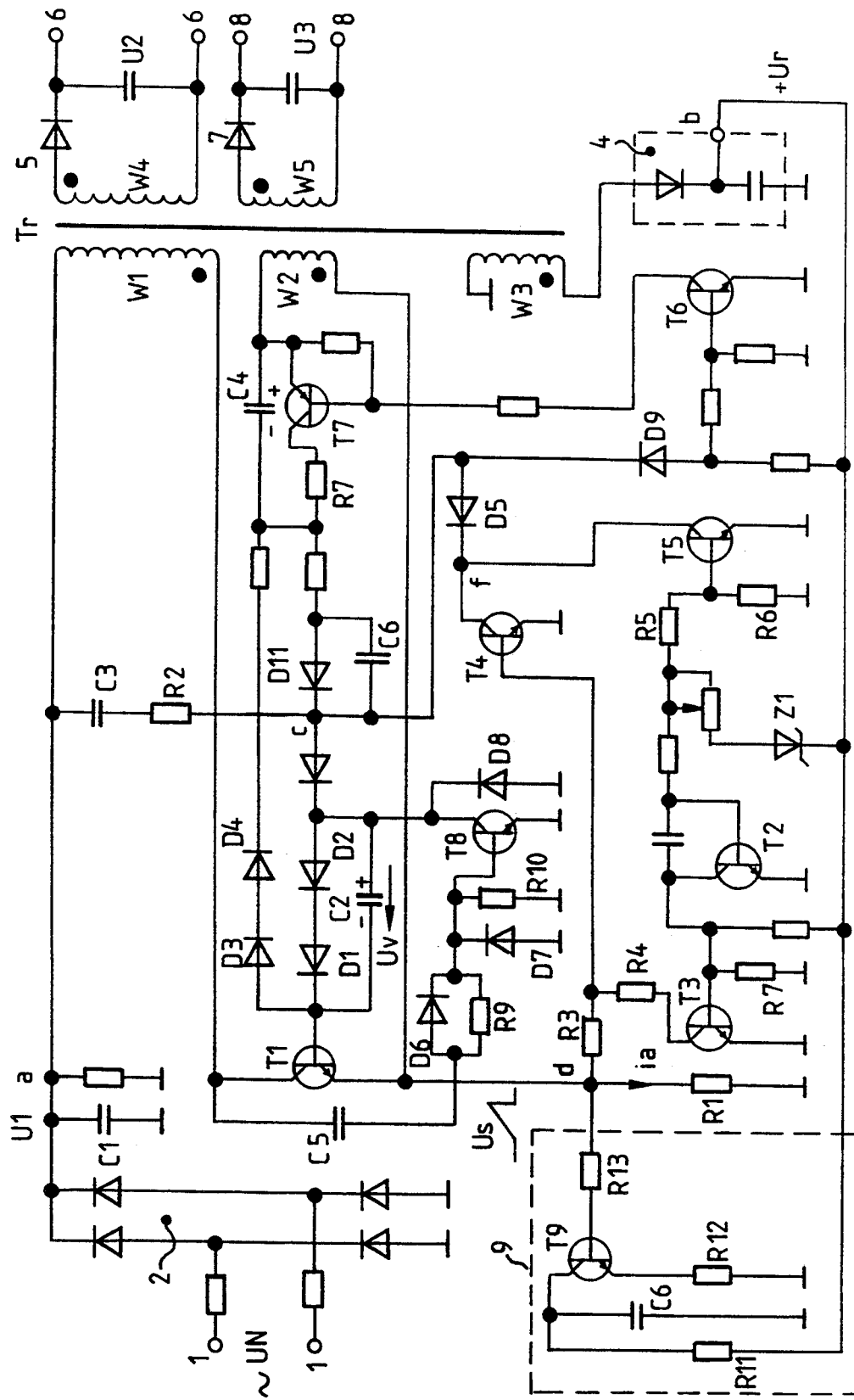
FIG. 1 is a circuit diagram of a preferred embodiment of a switched-mode power supply.

FIG. 1 shows a freely oscillating switched-mode power supply having input terminals 1 providing the system voltage UN, a system bridge rectifier 2, a charging capacitor C1, an isolating transformer Tr, a switching transistor T1 and a shunt R1. The isolating transformer Tr contains a primary or power winding W1, a further primary winding W2, which constructs the circuit in a freely oscillating fashion and drives the switching transistor T1, and a regulating winding W3, which effects at the output b of the control rectifier 4 a control voltage Ur for stabilizing and for switching over between operation at high power and low power. Transformer Tr includes a secondary winding W4, which generates a first operating voltage U2 at the terminals 6 via the rectifier 5, and a second secondary winding W5, which generates a further operating voltage U3 at the terminals 8 via the rectifier 7. Connected in the base line of the switching transistor T1 is a voltage blocking network, including diodes D1, D2 and the capacitor C2, which generates a blocking voltage Uv. Also, connected between the point a, which delivers the operating voltage U1 for the switched-mode power supply, and the point c in the base line of the switching transistor T1 is a start circuit with a capacitor C3 and a resistor R2. The circuit as described so far is known.

The control voltage Ur passes from the point b to a first threshold circuit having a Zener diode Z1 and transistors T2, T3. Transistor T3 is a component of a voltage divider, including resistors R3 and R4, which is connected between the point d and the base of the turn-off transistor T4, the collector/emitter junction of which is connected in series with a diode D5 between the point c in the base line of the switching transistor T1 and ground.

Control voltage Ur also passes, via the Zener diode Z1 and the voltage divider consisting of the resistors R5 and R6, to the base of the transistor T5, the collector of which is connected via the diodes D5 and D9 to the base of the transistor T6. The collector of transistor T6 is connected to the base of a transistor T7, the collector/emitter junction of which is connected in series with a resistor R7 in parallel with the coupling capacitor C4 in the base line of the switching transistor T1. The mode of operation of the circuit is explained separately below for normal operation at high power and operation at low power and packet control of T1.

In normal operation at high transmitted power of approximately 40–100 watts, voltage Ur first becomes smaller due to the high load of the transformer Tr. Ur then passes via the conductive Zener diode Z1 to the base of T2, and via T3 switches in the resistor R4 more or less as a voltage divider resistor. The sawtooth cut-off voltage Us, which drops due to the sawtooth current ia in the flow phase from T1 to R1, now passes more or less divided to T4 and has the effect that at a specific value T4 becomes conductive, grounds the point c, interrupts the base drive voltage for T1 and thereby turns off T1. Two limiting cases may now be considered. In the case of maximum load, there is to say minimum value of Ur, T2 is blocked, as a result of which T3 becomes conductive. Us is now divided in a maximum fashion by R3 and R4. This means that Us must assume a larger final value at the point d in order to turn on T4. The current ia thus reaches a high final value, and this corresponds to a large transmitted power. In the other limiting case, when the load at the terminals 6, 8 is low, Ur increases, so that now T2 becomes conductive and T3 is blocked. Us is now not divided by R3 and R4 and passes at full value to the base of T4. This means that it is already the case at a low value of Us and ia that T4 becomes conductive and T1 is turned off. This means, in turn, a lower final value of ia and thus a lower transmitted power. In normal operation between these limiting values, stabilization of U2 and U3 is now performed by pulse-width modulation in the turn-on duration of T1. If, for example, the load at the terminals 6, 8 increases, the amplitude of all the pulse voltages generated at the transformer Tr drops, and thus also does that of the positive control voltage Ur. As a result, a less positive voltage Ur, reduced by the voltage of the Zener diode Z1, passes to the base of T2, so that T2 becomes less conductive and T3 more conductive. Us is now divided more strongly by R3, R4, T3. This means that T4 does not become conductive until later and turns off T1, that is to say the final values of Us and ia assume larger final values, the transmitted power is increased and thus the reduction, assumed at the beginning, in the voltages U2, U3 and Ur is compensated. T4 thus effects a pulse-width modulation in the driving of T1 to the effect that the turn-on duration of T1 is increased by T4 with increasing load. In this way, the operating voltages U2, U3 that are generated are stabilized. Due to the voltage division by R5 and R6, T5 is still blocked in this case, as a result of which T6 and T7 are conductive. C4 is thereby bridged and has virtually no effect in this mode of operation.

If the load at the terminals 6, 8 is substantially reduced, for example in the case of active standby operation, the amplitude of the pulse voltages at the transformer Tr, and thus the value of Ur, increase. Despite the division by the voltage divider R5, R6, the transistor T5 now becomes conductive and the point f more negative, as a result of which the transistors T6 and thus also T7 are blocked. The capacitor C4 becomes effective in the base line of T1 due to the blocking of T7. C4 is thereby charged via the base/emitter diode of T1 with the polarity represented, until finally the voltage at C4 reaches the positive component of the voltage delivered by the winding W2 and the switching transistor T1 is blocked. The packet is thereby interrupted. There is then produced in the oscillation of T1 a pause which effects the packet operation described at the beginning. T1 now remains blocked for a certain time. As a result, the capacitors at the terminals 6, 8 are no longer recharged, so that Ur drops once again. At the end of the pause in the packet operation, T5 is finally blocked once again, T6 and T7 become conductive once again, and the capacitor C4 is bridged once again, so that the switching transistor T1 is once again supplied with base current by the winding W2 and oscillations are once again produced with full saturation of T1. Thus, the circuit represented effects automatic transition from normal operation at high transmitted power and PWM control in the driving of T1 and the packet operation in which T1 oscillates in each case only during the burst packets and does not oscillate therebetween for a time. In the packet operation, T3 is always blocked, so that Us passes subdivided to the base of T4, and thus T1 is already turned off in the case of a low current value of ia.

The collector of T5, that is to say the point f, is still connected to the point c in the base line of T1. The following is achieved thereby. At the end of the pause during packet operation, T5 is blocked once again, as described, so that a positive pulse which passes to the point c in the base line of T1 occurs at the point f. It is achieved thereby that the first drive pulse once again effects full saturation of T1 during the packet. This has the advantage that turning on once again after the pause is not performed "softly" with a corresponding power loss and risk to T1, but to a certain extent in a "hard" fashion.

Further provided between the collector of T1 and point c is a circuit with a capacitor C5, a diode D6, a resistor R9, a diode D7, a resistor R10, a transistor T8 and a diode D8. This additional circuit serves to improve the blocking of the switching transistor T1 at the end of the turn-on phase, that is to say upon cutting of ia, and operates as follows: the turn-on time of T1 is terminated inherently by the turned-on transistor T4 by T4 cutting off the base current for T1. Thereafter, T1 remains conductive without base current for a certain time, owing to the saturation of charge carriers present in the transistor T1. T1 leaves saturation after a few μs without base current, as a result of which the collector becomes somewhat positive with respect to ground. In the meantime, the capacitor C2 is recharged with the represented polarity to the voltage Uv, specifically the sum of the forward voltages of D1 and D2. The conductive T8 thus grounds the positive electrode of C2. As a result, the full voltage Uv becomes effective with negative polarity at the base of T1, so that turning off T1 is achieved in a conceivably short time. D7 serves to protect D8 against an excessively high negative voltage at the base. The overall result of the fact that T4 and T8 rapidly turn off T1 is a particularly small power loss in T1. The diode D8 between the collector of T8 and ground has the following task. Together with the diodes D1, D2, D3, D4 and R in the base line of T1, D8 stabilizes the negative voltage fed by the winding W2 to the base of T1. The negative voltage delivered by the winding W2 is high in an inherently uncontrolled fashion, and can assume impermissibly high values at the base/emitter junction of T1. The sub-assemblies D4, D3, D1, D2 and D8 serve to limit this negative voltage of, for example, greater than 5 volts at the base/emitter junction of T1. Moreover, an undesired inverse operation of T8 is thereby prevented. The negative voltages passing to the base of T1 are then both limited, specifically the negative voltage of C2 by the diodes D1 and D2, and the negative voltage from the winding W2 by the didoes D4, D3, D1, D2 and D8. An additional protection of T1 against an excessively high base/emitter voltage is achieved by means of this circuit.

The network C5, D6, R9 serves additionally as a so-called snubber for limiting positive voltage peaks at the collector of T1 at the start of the blocking phase of TI. The network thus advantageously has a double function, specifically improving the blocking of T1 at the start of the blocking phase and additionally limiting positive voltage peaks at the collector of TR1. This is achieved when the inherently grounded right-hand end of the parallel circuit D6/R9 is not directly grounded but is connected to the base of the auxiliary switching transistor T8.

Provided further between the point d and the point b is the additional circuit 9 with the transistor T9, the capacitor C6 and the resistors R11, R12, R13. This circuit additionally serves to reduce the internal resistance at the outputs of the switched-mode power supply and operates in the following way in the manner of a controlled current sink: with increasing load, there is an increase in ia and Us at the point d due to the pulse-width control. As a result, T9 also becomes more conductive via the resistor R13. Owing to the filtering effect due to C6, an increased DC load which further reduces the value of Ur thus becomes effective at the point b. As a result, the control voltage path is simulated an additional reduction of Ur, and the effect of the reduced value of Ur is thus increased to increase the maximum value of Us and ia. The negative internal resistance formed by the circuit 9 is thus capable of compensating the inherently still remaining positive internal resistance of the switched-mode power supply, and thus of ensuring for normal operation at high transmitted power a very low internal resistance of the switched-mode power supply.

Figure 2:
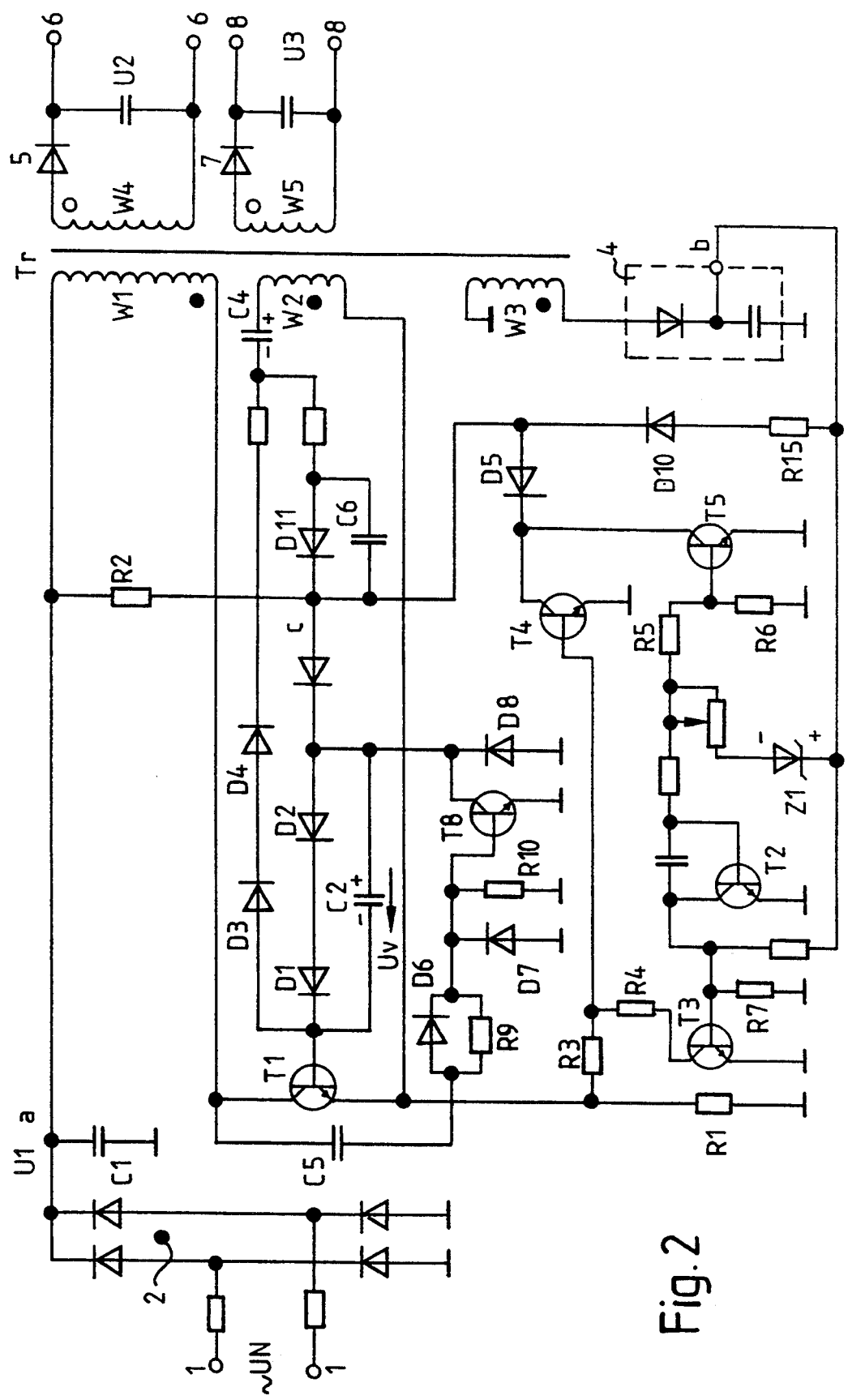
FIG. 2 is a simplified version of the circuit in accordance with FIG. 1.

FIG. 2 shows a simplified version of the circuit according to FIG. 1. The circuit according to FIG. 2 does not contain the circuit 9 for forming a negative internal resistance, nor does it contain the transistor T7 which short-circuits the coupling capacitor C4 in the way described. Instead of the transistor T7, the coupling capacitor C4 is provided with a current path with the diode D10 and the resistor R15. In the case of packet operation, in this solution the base current for T1 varies in each case during a packet to the effect that the base current decreases towards the end of the packet. Since the circuit 9 for reducing the internal resistance is not present, it is possible to achieve a low internal resistance by improved coupling of the transformer Tr, for example by designing the transformer as a chamber winding transformer. The feature that the base current for T1 slightly decreases during a packet because the coupling capacitor C4 is not short-circuited can be tolerated in view of the simplification of the circuit. Moreover, a lower packet frequency of approximately 50 Hz can thereby be achieved. Such a low packet frequency in active standby operation is important, because it is inaudible, and therefore it is not possible for audible acoustic oscillations or vibrations of the unit to occur in active standby operation.

The capacitor C6 in parallel with the diode D11 in FIGS. 1 and 2 has a particular importance for the starting operation, that is to say in each case when the receiver is switched on, since then the diode D11 is firstly blocked. The capacitor C6 has a particular importance in the case of low system voltages, in order even then to ensure saturation of T1 and to avoid risk to T1 due to lack of saturation.

Figure 3:
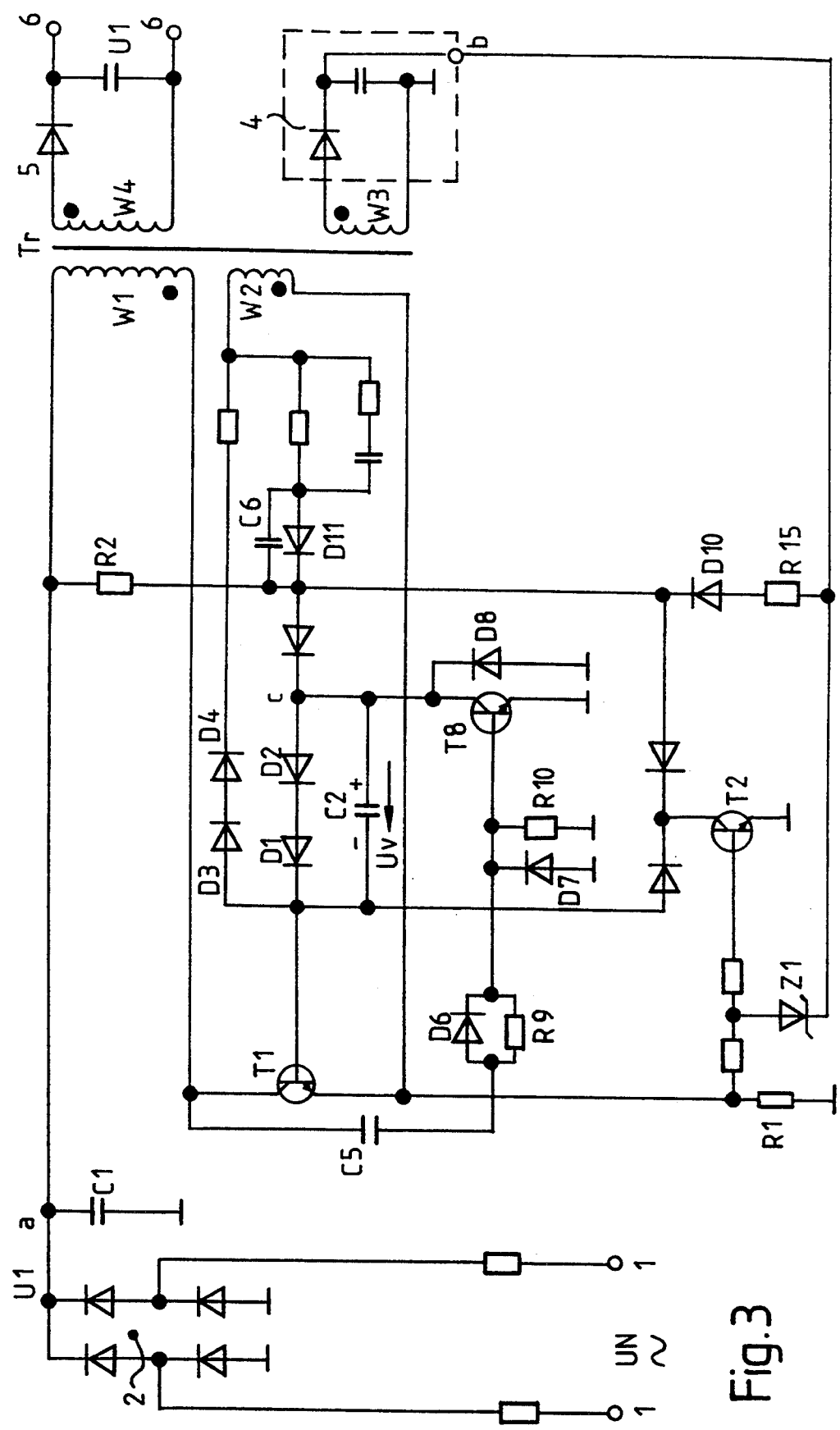
FIG. 3 is a modification of the circuit according to FIG. 2.

FIG. 3 shows a modification of the circuit according to FIG. 2 which likewise operates without the circuit 9 of FIG. 1 and without the transistor T7 for bridging the coupling capacitor C4. The mode of operation of the circuit in accordance with FIG. 3 is similar to that of the circuit according to FIG. 2.

In a circuit tested in practice, the sub-assemblies essential to the invention had the following values:

| R1: | 4.7 ohms | C2: | 0.68 μF |
|---|---|---|---|
| R2: | 22 kohms | C3: | 4.7 μF |
| R3 | 220 ohms | C4: | 47 μF |
| R4 | 22 ohms | C5: | 470 pF |
| (start C) | (packet c) | (rectifier C) | |
| C3 : | C4 : | C (point b) = 1:10:100 | |
| 4.7 μF | 47 μF | 470 μF | |
| R5 | 100 kohms | | |
| R6 | 100 kohms | | |
| R7 | 10 ohms | | |
| R9 | 220 ohms | | |
| R10 | 470 ohms | | |
| R11 | 100 ohms | | |
| R12 | 10 ohms | | |
| R13 | 100 ohms | | |
| C6: | 22 μF | | |

I claim:

1. A freely oscillating switched-mode power supply comprising:
   a transformer having a primary winding, a secondary winding for providing an output voltage, and a regulating winding for providing a measuring voltage;
   a switching transistor, having a cutoff voltage and being coupled to said primary winding for controlling current therein;
   means for generating a control voltage coupled to said measuring voltage;
   first feedback means for varying said cutoff voltage responsive to said control voltage when said control voltage exceeds a first threshold value; and
   second feedback means responsive to said control voltage for initiating burst mode operation of said switching transistor when said control voltage exceeds a second threshold value.

2. The power supply of claim 1 wherein said first feedback means comprises a potential divider with a control transistor.

3. The power supply of claim 1 wherein said second feedback means comprises voltage divider networks including transistors and a capacitor.

4. The power supply of claim 3 further wherein said capacitor is switched in the base line of said switching transistor.

5. The power supply of claim 2 wherein said first feedback means couples a current sample from said switching transistor to provide control thereof.

6. The power supply of claim 1 wherein said means for generating said control voltage is a rectifier.

7. The power supply of claim 1 further comprising means for varying said control voltage responsive to a current sample from said switching transistor.

* * * * *

(12) EX PARTE REEXAMINATION CERTIFICATE (8618th)
United States Patent
Palata

(10) Number: US 5,390,100 C1
(45) Certificate Issued: Oct. 11, 2011

(54) FREELY OSCILLATING SWITCHED-MODE POWER SUPPLY

(75) Inventor: Jaromir Palata, Villingen (DE)

(73) Assignee: Deutsche Thomson-Brandt GmbH, Villingen-Schwenningen (DE)

Reexamination Request:
No. 90/010,954, Jun. 10, 2010

Reexamination Certificate for:
Patent No.: 5,390,100
Issued: Feb. 14, 1995
Appl. No.: 08/043,714
Filed: Apr. 8, 1993

(51) Int. Cl.
*H02M 3/338* (2006.01)
*H02M 3/24* (2006.01)
*H04N 5/63* (2006.01)

(52) U.S. Cl. .......................................... 363/19; 363/18
(58) Field of Classification Search ...................... 363/19
See application file for complete search history.

(56) References Cited

U.S. PATENT DOCUMENTS

| | | | |
|---|---|---|---|
| 4,361,865 A | 11/1982 | Shono | |
| 4,573,112 A | 2/1986 | Numata et al. | |
| 4,623,960 A | 11/1986 | Eng | |
| 4,958,268 A | 9/1990 | Nagagata et al. | |
| 5,089,947 A | 2/1992 | Driscoll et al. | |
| 5,175,675 A | 12/1992 | Uramoto | |

FOREIGN PATENT DOCUMENTS

| | | |
|---|---|---|
| DE | 2651196 | 5/1978 |
| DE | 274308 | 12/1989 |
| DE | 3943254 A1 | 4/1991 |
| EP | 0096300 | 12/1983 |
| EP | 0466627 A2 | 1/1992 |
| JP | 03-239137 | 10/1991 |
| JP | 3-239137 | 10/1991 |

OTHER PUBLICATIONS

English language translation of abstract of JP 03-239137 (published Oct. 24, 1991).

*Primary Examiner* — Linh M. Nguyen

(57) ABSTRACT

A freely oscillating switched-mode power supply includes a transformer having a power winding for providing an output voltage, a drive winding for providing a switching voltage and a regulating winding for providing a measuring voltage. A switching transistor provides a cutoff voltage to change the output voltage. A rectifier receives the measuring voltage and generates a control voltage representative of the measuring voltage. A first voltage divider receives the control voltage and turns the switching transistor on when the cutoff voltage is above a first threshold value. A second voltage divider receives the control voltage and turns the switching transistor off when the cutoff voltage is below a second threshold value.

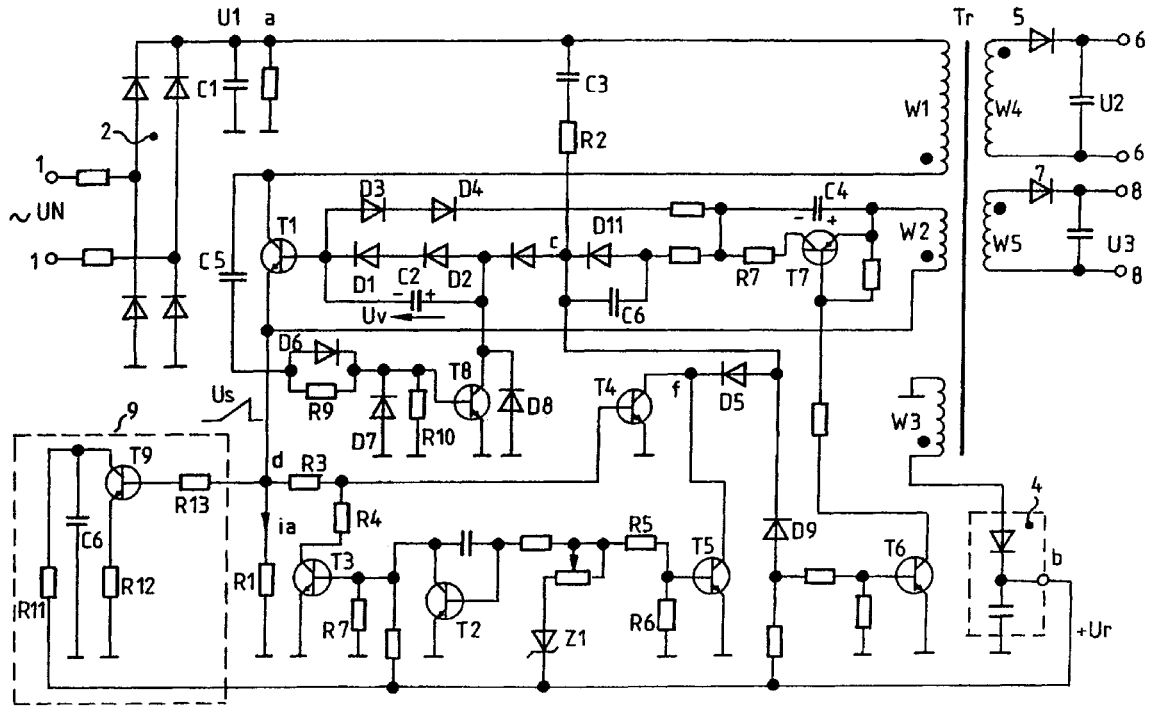

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4 and 6 is confirmed.

Claims 5 and 7 were not reexamined.

* * * * *